US008582894B2

(12) United States Patent
Asano

(10) Patent No.: US 8,582,894 B2
(45) Date of Patent: Nov. 12, 2013

(54) ELECTRONIC APPARATUS AND CHARACTER STRING RECOGNIZING METHOD

(75) Inventor: Mieko Asano, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 182 days.

(21) Appl. No.: 13/314,419

(22) Filed: Dec. 8, 2011

(65) Prior Publication Data

US 2012/0250989 A1 Oct. 4, 2012

(30) Foreign Application Priority Data

Mar. 30, 2011 (JP) ................................. 2011-076420

(51) Int. Cl.
*G06K 9/62* (2006.01)
(52) U.S. Cl.
USPC ........................................ 382/224; 382/195
(58) Field of Classification Search
USPC ......... 382/101, 164, 165, 177, 190, 195, 224, 382/292
See application file for complete search history.

(56) References Cited

U.S. PATENT DOCUMENTS 5,337,370 A * 8/1994 Gilles et al. .................... 382/102
5,818,952 A 10/1998 Takenouchi et al.
6,738,519 B1 * 5/2004 Nishiwaki .................... 382/228
6,867,875 B1 * 3/2005 Kanai et al. .................. 358/1.15
2007/0116360 A1 * 5/2007 Jung et al. .................... 382/176

FOREIGN PATENT DOCUMENTS

| JP | H01-295383 | 11/1989 |
| JP | 7-334620 A | 12/1995 |
| JP | 8-185485 A | 7/1996 |
| JP | H10-171757 | 6/1998 |
| JP | 2002-288589 | 10/2002 |
| JP | 2003-162688 A | 6/2003 |
| JP | 2005-004334 | 1/2005 |

OTHER PUBLICATIONS

Japanese Office Action dated Mar. 27, 2012 for Japanese Application No. 2011-076420 filed on Mar. 30, 2011.

* cited by examiner

*Primary Examiner* — Phuoc Tran
(74) *Attorney, Agent, or Firm* — Knobbe, Martens Olson & Bear LLP

(57) ABSTRACT

An electronic apparatus includes a character detector, a feature detector, a character string combiner, and a controller. The character detector detects a first character candidate and a second character candidate from an image. The feature detector detects first feature data and second feature data, the first and second feature data including at least character size, color, or line width of the first and second character candidate. The character string combiner combines the first and second character candidates to form a character string when a degree of coincidence between the first and second feature data at least satisfies a threshold coincidence value. The controller detects a portion of the character string indicative of an attribute and activates a function corresponding to the attribute.

10 Claims, 12 Drawing Sheets

FIG.4

| FEATURE DATA \ CHARACTER CANDIDATE | 1 | 2 | 3 | 4 | 5 | 6 | 7 | 8 |
|---|---|---|---|---|---|---|---|---|
| LINE WIDTH (pt) | 0.5 | 0.6 | 0.7 | 0.8 | 0.9 | 1.0 | 1.1 | 1.2 |
| SIZE (pt) | 10 | 12 | 14 | 16 | 18 | 20 | 22 | 24 |
| COLOR | BLACK | BLACK | BLACK | BLACK | BLACK | BLACK | BLACK | BLACK |

FIG. 6

| FEATURE DATA | PRIORITY RANK | CONTRIBUTION FACTOR |
|---|---|---|
| LINE WIDTH | FIRST | $\alpha$ (50%) |
| SIZE | SECOND | $\beta$ (30%) |
| COLOR | THIRD | $\gamma$ (20%) |

FIG. 11

| FEATURE DATA | STATUS/ADDITIONAL PRIORITY RANK | CONTRIBUTION FACTOR |
|---|---|---|
| LINE WIDTH | ALREADY DETECTED | $\alpha$ (50%) $\times$ N |
| SIZE | ALREADY DETECTED | $\beta$ (30%) $\times$ N |
| COLOR | ALREADY DETECTED | $\gamma$ (30%) $\times$ N |
| CHARACTER KIND | ADDITIONAL PRIORITY RANK: FIRST | $\delta$ (10%) |
| DIRECTION | ADDITIONAL PRIORITY RANK: SECOND | $\varepsilon$ (5%) |
| FONT | ADDITIONAL PRIORITY RANK: THIRD | $\zeta$ (3%) |

ADDITIONAL FEATURE DATA CANDIDATES: CHARACTER KIND, DIRECTION, FONT

ELECTRONIC APPARATUS AND CHARACTER STRING RECOGNIZING METHOD

CROSS REFERENCE TO RELATED APPLICATION

The present disclosure relates to and claims the benefit of priority from Japanese Patent Application No. 2011-076420, filed on Mar. 30, 2011, which is incorporated herein by reference in its entirety.

FIELD

An exemplary embodiment of the present invention relates to an electronic apparatus and a character string recognizing method.

BACKGROUND

A procedure of reading a document or the like as image data, recognizing a character string existing in the generated image data, and using the recognized character string as part of a database is known. One character recognition method is disclosed which can increase the detection accuracy of a character string whose character interval and word interval are short.

There are posters etc. having such designs that plural character strings overlap with each other. To correctly recognize such a character string as a URL or a mail address that a user wants to acquire, which exists in a document or a poster containing plural character strings, it is necessary to recognize a character string in view of plural features such as a direction of the character string in addition to a character interval.

BRIEF DESCRIPTION OF THE DRAWINGS

A general configuration that implements the various features of the invention will be described with reference to the drawings. The drawings and the associated descriptions are provided to illustrate embodiments of the invention and should not limit the scope of the invention.

FIG. 4 shows a table of feature data of character candidates which is used in the first embodiment.

FIG. 6 shows a feature data table used in the first embodiment.

FIG. 11 shows a feature data table used in a third embodiment.

DETAILED DESCRIPTION OF THE EMBODIMENTS

According to an exemplary embodiment of the present invention, there is provided an electronic apparatus including a character detector, a feature detector, a character string combiner, and a controller. The character detector is configured to detect a first character candidate and a second character candidate from an image. The feature detector is configured to detect first feature data and second feature data, the first feature data including at least a character size, color, or line width of the first character candidate and the second feature data including at least character size, color, or line width of the second character candidate. The character string combiner is configured to combine the first and second character candidates to form a character string when a degree of coincidence between the first feature data and second feature data at least satisfies a threshold coincidence value. The controller is configured to detect a portion of the character string indicative of an attribute, and to activate a function corresponding to the attribute.

Embodiments will be hereinafter described with reference to the drawings.

Figure 1A:
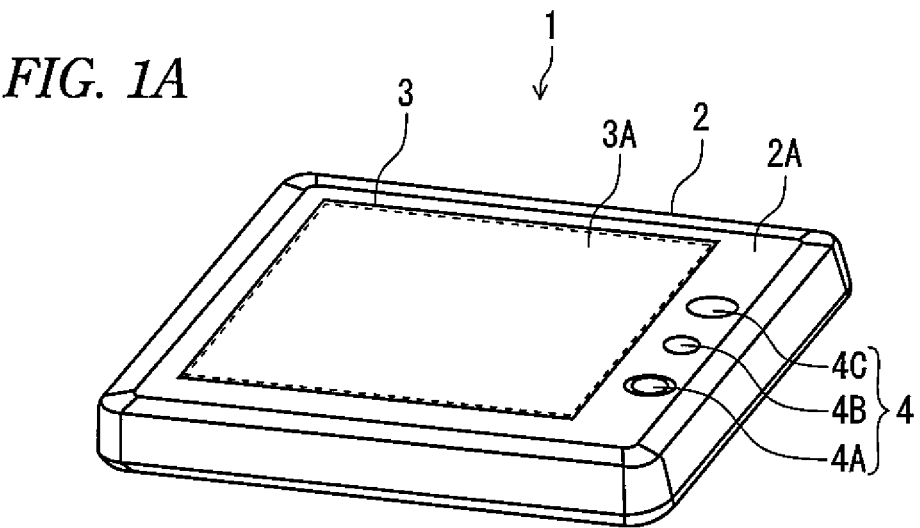
FIGS. 1A and 1B show appearances of an electronic apparatus according to a first embodiment.
Figure 1B:
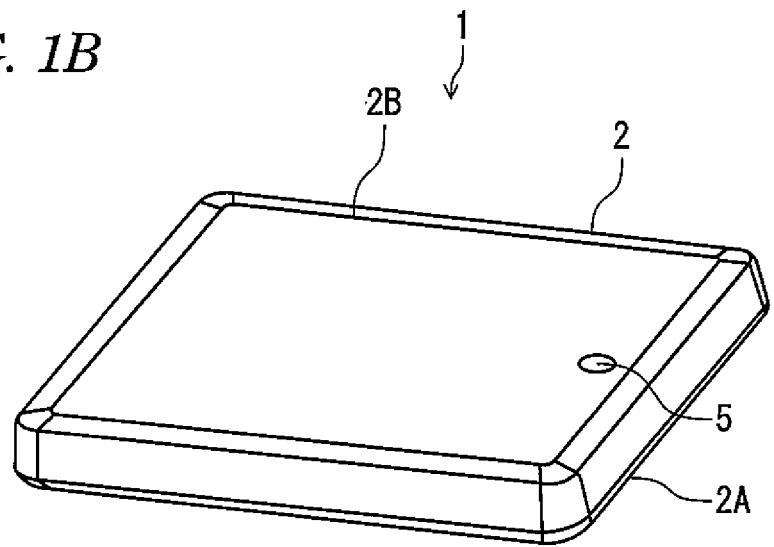

FIGS. 1A and 1B show appearances of an electronic apparatus 1 according to a first embodiment. As shown in FIGS. 1A and 1B, the electronic apparatus 1 has a rectangular, flat shape. FIG. 1A shows a state that a top surface 2A of the electronic apparatus 1 is up, and FIG. 1B shows a state that its bottom surface 2B is up.

As shown in FIG. 1A, the electronic apparatus 1 is equipped with a display device 3 and manipulations 4 which are exposed in the top surface 2A of a cabinet. The display device 3 is an LCD (liquid crystal display) or the like and can display a moving image. A transparent touch screen 3A is provided on the top surface of the display device 3, and a touch screen display is realized by the display device 3 and the touch screen 3A. Functioning as a manipulation input unit 10, the touch screen display detects a touch area (also referred to as a touch position), touched by a pen or a finger, on the display screen. With this touch position detecting function, the user can select a desired character area from an image displayed on the display device 3 by touching it.

The manipulation buttons 4 which are exposed in the top surface 2A of the cabinet of the electronic apparatus 1 also functions as the manipulation input unit 10 and are discriminated from each other as manipulation buttons 4A, 4B, and 4C. The manipulation buttons 4A, 4B, and 4C are assigned different functions such as a power on/off switching function, a cursor moving function, and an enter function. By manipulating the manipulation buttons 4A, 4B, and 4C, the user can select desired character regions from an image that is displayed on the display device 3. One example manipulation method for selecting character regions using the manipulation buttons 4 is to move a cursor to select plural sectioned character regions and select them. As shown in FIG. 1B, the electronic apparatus 1 is equipped with a camera 5 which is exposed in the bottom surface 1B of the cabinet.

Figure 2:
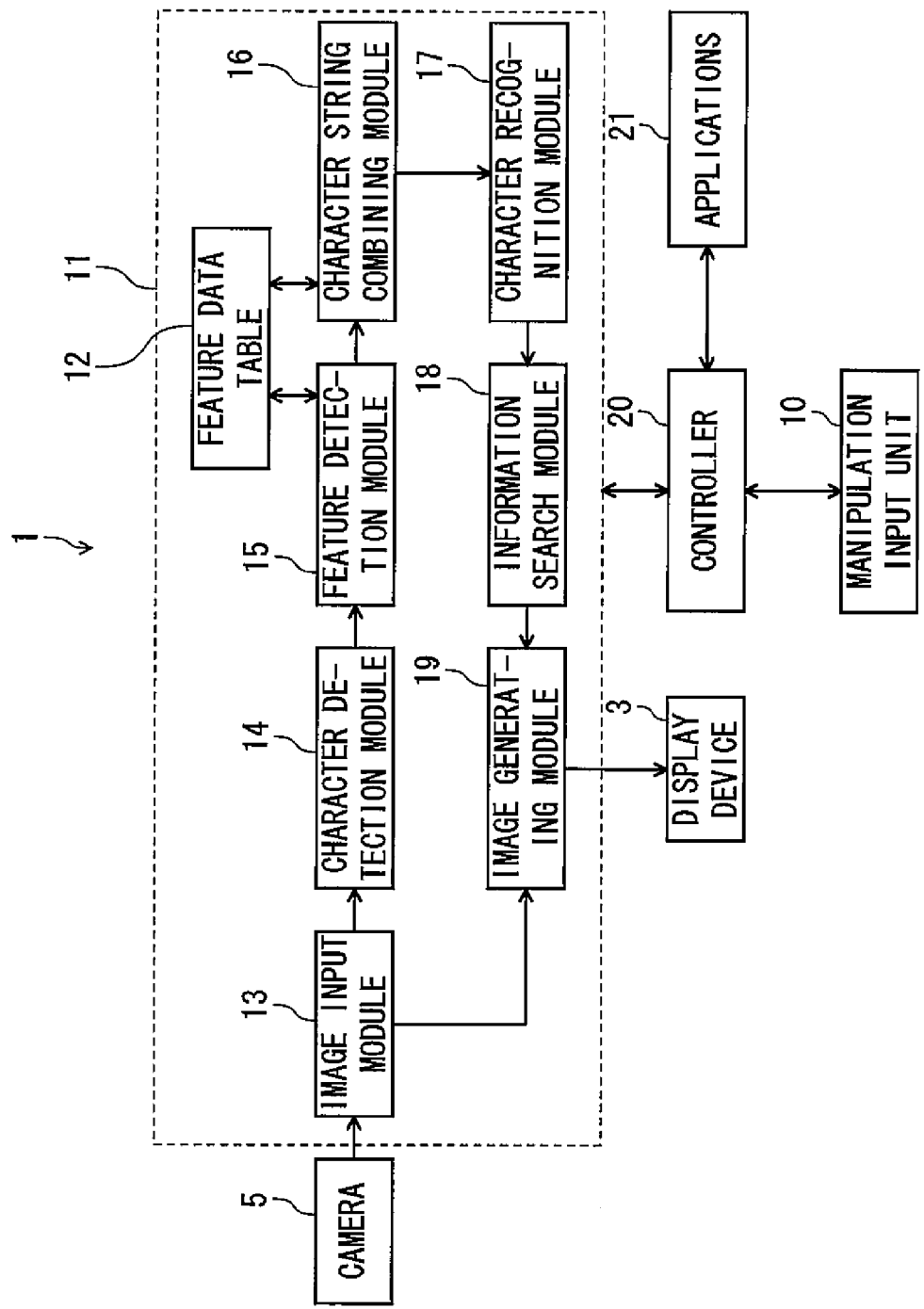
FIG. 2 is a functional block diagram of the electronic apparatus according to the first embodiment.

Next, functions of the electronic apparatus 1 according to the embodiment will be described with reference to FIG. 2. FIG. 2 is a functional block diagram of the electronic apparatus according to the embodiment.

The electronic apparatus 1 includes the display device 3, the camera 5, a character recognition application 11, the manipulation input unit 10, a controller 20, and applications 21. The character recognition application 11 has, as functional modules, an image input module 13, a character detection module 14, a feature detection module 15, a character string combining module 16, a character recognition module 17, an information search module 18, and an image generating module 19.

The manipulation input unit 10 supplies the controller 20 with a manipulation command that is input by manipulating the manipulation buttons 4 or the touch screen 3A.

The controller 20 controls operations of the entire electronic apparatus 1. The controller 20 runs the character recognition application 11 and the various applications 21. The applications 21 are a browser, a mail application, etc.

Next, the functions of the respective functional modules of the character recognition application 11 will be described. The image input module 13 inputs image data to the character detection module 14 and the image generating module 19. Image data to be input to the modules 14 and 19 may be any of image data taken by the camera 5 of the electronic apparatus 1, image data imported externally, and image data downloaded over a network. As for the form of image data, image data may be a document image or a natural image such as a scene or a poster.

The character detection module 14 detects character candidates 102 (see FIG. 3) from the image data that is input from the image input module 13. For example, the character detection module 14 detects, as character candidates 102, regions that appear to contain characters by scanning the entire image data and using character samples that are stored in advance. Alternatively, the character detection module 14 may scan the entire image data, cut out image regions in plural sizes, recognize characters as in conventional optical character recognition, and employ regions that are high in similarity as character candidates 102. That is, the character detection module 14 detects local regions containing character candidates 102. As a further alternative, the character detection module 14 may detect character candidates 102 from a character candidate search region 101 that is selected by the manipulation input unit 10. More specifically, the character detection module 14 determines a character candidate search region 101 based on user manipulations on the touch panel 3A or the manipulation buttons 4. Since the character candidate search region 101 is selected by the user, the electronic apparatus 1's processing of detecting character candidates 102 is reduced in power consumption and a region containing a character string 103 the user wants to detect can be selected more properly with a low load.

The feature detection module 15 detects feature data indicating features of each of the character candidates 102 detected by the character detection module 14. Kinds of feature data to be detected are stored in the form of a feature data table 12. Kinds of feature data indicating features of a character are a line width, a size, a color, etc. of the character. The feature data will be described later with reference to FIGS. 3 and 4.

The character string combining module 16 determines, using the feature data detected by the feature detection module 15, whether or not the detected character candidates 102 should be combined into a character string 103. The character string combining module 16 performs character string composition according to priority ranks and contribution factors of the kinds of feature data by referring to the feature data table 12. A procedure by which the character string combining module 16 combines character candidates 102 will be described later.

The character recognition module 17 separates an image of the character string 103 obtained by the character string combining module 16 into a background and characters and performs character recognition.

The information search module 18 cooperates with the controller 20 to, for example, activate a corresponding application 21 using the character recognition results of the character recognition module 17. The information search module 18 holds a database that correlates attribute-indicative portions of character strings with applications, and selects an application that has been recognized as corresponding to the recognized character string by referring to this database. For example, "http://" is correlated with a browser and "@" is correlated with a mail application. Where the electronic apparatus 1 has a telephone function, a character string of numerals may be correlated with a telephone application. The information search module 18 outputs the character recognition results to the image generating module 19.

The image generating module 19 generates an image to be displayed on the display device 3 based on the image data that is input from the image input module 13 and the image data that is input from the information search module 18. For example, the character recognition results may be superimposed on the image data that is input from the image input module 13. Alternatively, an application window activated by the information search module 18 may be displayed separately from a window of the image data that is input from the image input module 13. A character recognition result picture may be a picture in which an application name corresponding to the recognized character information is displayed or a picture through which to select activation of the corresponding application.

Figure 3:
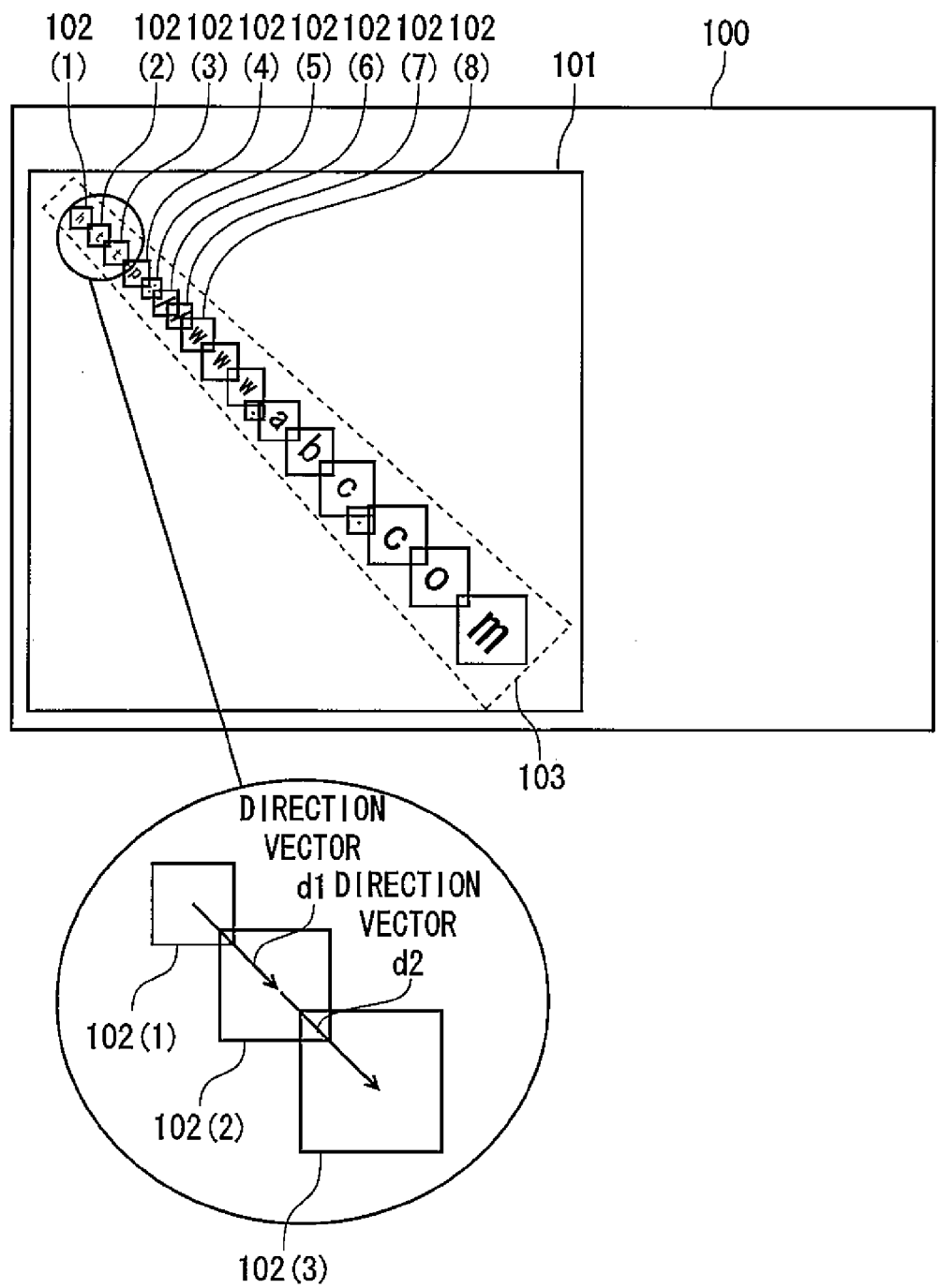
FIG. 3 illustrates a first example for description of character string combining processing according to the first embodiment.

Next, the feature data will be described with reference to FIGS. 3 and 4. FIG. 3 illustrates a first example for description of character string combining processing according to the embodiment. FIG. 4 shows a table of feature data of character candidates which is used in the embodiment.

First, the feature detection module 15 generates a coordinate system in which the top-left corner of a display screen 100, for example, is employed as the origin (coordinates: (0, 0)). If a character candidate search region 101 is selected by the manipulation input unit 10, the feature detection module 15 generates a coordinate system in which the top-left corner of the character candidate search region 101 is employed as the origin. Among the character candidates 102, the feature detection module 15 sets, as a first character candidate 102(1), a character candidate 102 with which the distance between the center of the region of the character candidate 102 and the origin is shortest. Then, the feature detection module 15 sets, as a second character candidate 102(2), a character candidate 102 that is close to the first character candidate 102(1). The term "close" means "within a prescribed distance." Which character candidate 102 should be selected when plural character candidates 102 are detected as being close to the first character candidate 102(1) will be described later.

In the above-described manner, character candidates close to each other are assigned serial numbers in order starting from the first character candidate 102(1). A character string 103 shown in FIG. 3 "http://www.abc.com" consists of the first character candidate 102(1) to an 18th character candidate 102(18). FIG. 3 shows a state that symbols are assigned to the first character candidate 102(1) to the eighth character candidate 102(8), which are "h," "t," "t," "p," ":," "/," "/," and "w," respectively.

FIG. 4 is a table showing feature data of the respective character candidates that are assigned the symbols in FIG. 3.

As for the timing of acquisition of feature data of respective character candidates 102, feature data of all character candidates 102 may be detected and stored upon their detection. Alternatively, feature data of each character candidate 102 may be detected at the time of character string composition (described later).

As shown in FIG. 4, the first character candidate 102(1) has line width data "0.5 pt," size data "10 pt," and color data "black." The second character candidate 102(2) has line width data "0.6 pt," size data "12 pt," and color data "black." The feature data of the third character candidate 102(3) to the eighth character candidate 102(8) are also shown in FIG. 4.

Other kinds of feature data of a character candidate 102 are a character kind, a character font, a character rotation angle, a direction of a character string 103. Examples of the character kind are a numeral, a symbol, an alphabetical character, "a kanji," "hiragana," etc. Examples of the font are "Mincho" and "Gothic." A rotation angle can be calculated by comparing a character portion in a character candidate 102 with a character sample. For example, the character candidate "h" shown in FIG. 3 is rotated clockwise by 45°.

The direction data of a character string 103 is direction vectors that connect the centers of the character regions of the respective character candidates 102. A direction vector d1 between the first character candidate 102(1) and the second character candidate 102(2) is shown in the bottom part of FIG. 3 in an enlarged manner. The coordinates of the center of the character region of the first character candidate 102(1) and those of the second character candidate 102(2) can be defined by employing the top-left corner of the display screen 100 as the origin (coordinates: (0, 0)). The direction vector d1 can be calculated by subtracting the coordinates of the second character candidate 102(2) from those of the first character candidate 102(1).

Likewise, a direction vector d2 is calculated by subtracting the coordinates of the second character candidate 102(2) from those of the third character candidate 102(3) from those of the second character candidate 102(2). Direction data of the character string 103 can be obtained by calculating, in order, direction vectors between the character candidates 102 constituting the character string 103. In the example of FIG. 3, the direction vectors between the character candidates 102 are in the same direction, which means that the character candidates 102 are arranged in line in the direction indicated by the direction vectors. On the other hand, in a character string 103A shown in FIG. 9, direction vectors vary regularly, which means that the character candidates 102 are arranged regularly. The character string combining module 16 can recognize even a character string in which character candidates 102 are arranged in a complicated manner by acquiring direction data in the above-described manner.

Figure 5:
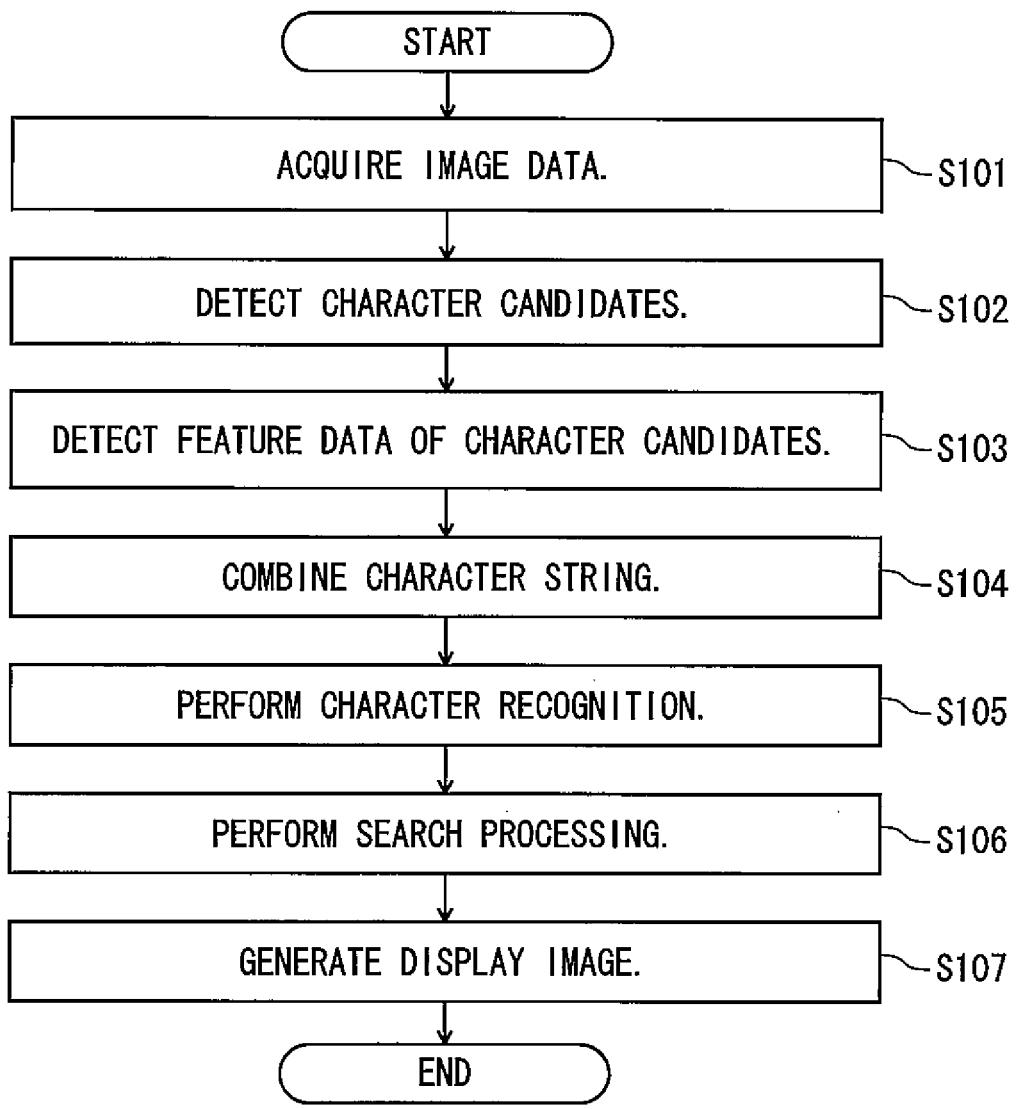
FIG. 5 is a flowchart of the character recognition process according to the first embodiment.

Next, a character recognition process according to the embodiment will be described with reference to FIG. 5. FIG. 5 is a flowchart of the character recognition procedure according to the embodiment.

First, at step S101, the image input module 13 acquires image data and inputs the image data to the character detection module 14 and the character generating module. At step S102, the character detection module 14 detects character candidates 102 from the image data.

At step S103, the feature detection module 15 detects feature data indicating features of the character candidates 102. At step S104, the character string combining module 16 forms a character string 103 by combining the character candidates 102 using the feature data that were detected at step S103.

At step S105, the character recognition module 17 separates the character string 103 that was combined at step S104 from the background and performs character recognition on the character string 103. At step S106, the information search module 18 performs search processing using character recognition results of step S105. At step S107, the image generating module 19 generates a display image to be output to the display device 3 using search results of step S106 and the image data. Then, the character recognition process according to the embodiment is finished.

Next, a character string combining process according to the embodiment will be described. FIG. 6 shows a feature data table used in the embodiment. The character string combining module 16 sets a kind(s) of feature data in forming a character string 103 by combining the character candidates 102. Where plural kinds of feature data are set, the character string combining module 16 sets a priority rank and a contribution factor for each kind of feature data. The degree of coincidence between character candidates 102 is calculated using the following Equation (1), for example. As seen from Equation (1), the degree of coincidence between character candidates 102 is the sum of the products of the degree of coincidence of each kind of feature data between the character candidates 102 and its contribution factor.

$$(\text{Degree of coincidence between character candidates}) = \Sigma\{(\text{degree of coincidence of feature data}) \times (\text{contribution factor of feature data})\} \quad \text{Equation (1)}$$

In the example of FIG. 6, the line width data, the size data, and the color data are given first priority, second priority, and third priority, respectively, and are also given contribution factors 50%, 30%, and 20%, respectively. The character string combining module 16 calculates a degree of coincidence between character candidates 102 by weighting the plural kinds of feature data. For example, in the example of FIG. 6, a degree of coincidence between character candidates 102 is calculated according to the following Equation (2).

$$(\text{Degree of coincidence between character candidates}) = \\ (\text{degree of coincidence of line width}) \times \alpha + \\ (\text{degree of coincidence of size}) \times \beta + \\ (\text{degree of coincidence of color}) \times \gamma \quad \text{Equation (2)}$$

The character string combining module 16 calculates a degree of coincidence of each kind of feature data by comparing detected values of that kind of feature data. For example, the degree of coincidence of a certain kind of feature data is decreased in proportion to the absolute value of the difference between values of that kind of feature data (the degree of coincidence is 100% when feature data values are the same). Taking the line width data shown in FIG. 4 as an example, the degree of coincidence between the first character candidate 102(1) and the second character candidate 102 (2) is higher than that between the first character candidate 102(1) and the third character candidate 102(3). A proportionality constant to be used in an equation for calculating the degree of coincidence of each kind of feature data using the absolute value of the difference between feature data value as a variable is set in advance. The character string combining module 16 sets, in advance, a threshold value for the degree of coincidence between character candidates 102 to be combined into a character string 103.

Figure 7:
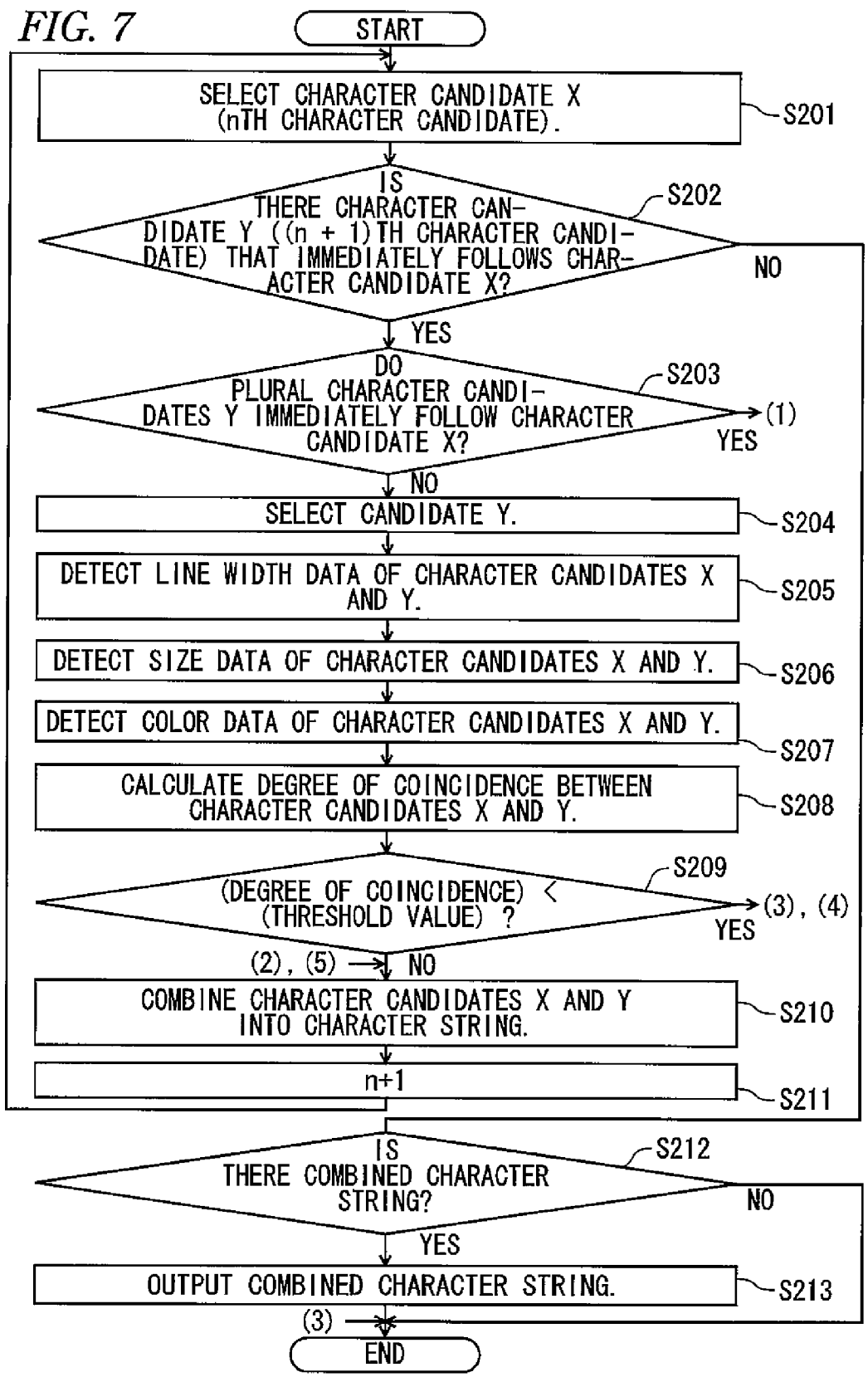
FIG. 7 is a first flowchart of a character string combining process according to the first embodiment.
Figure 8:
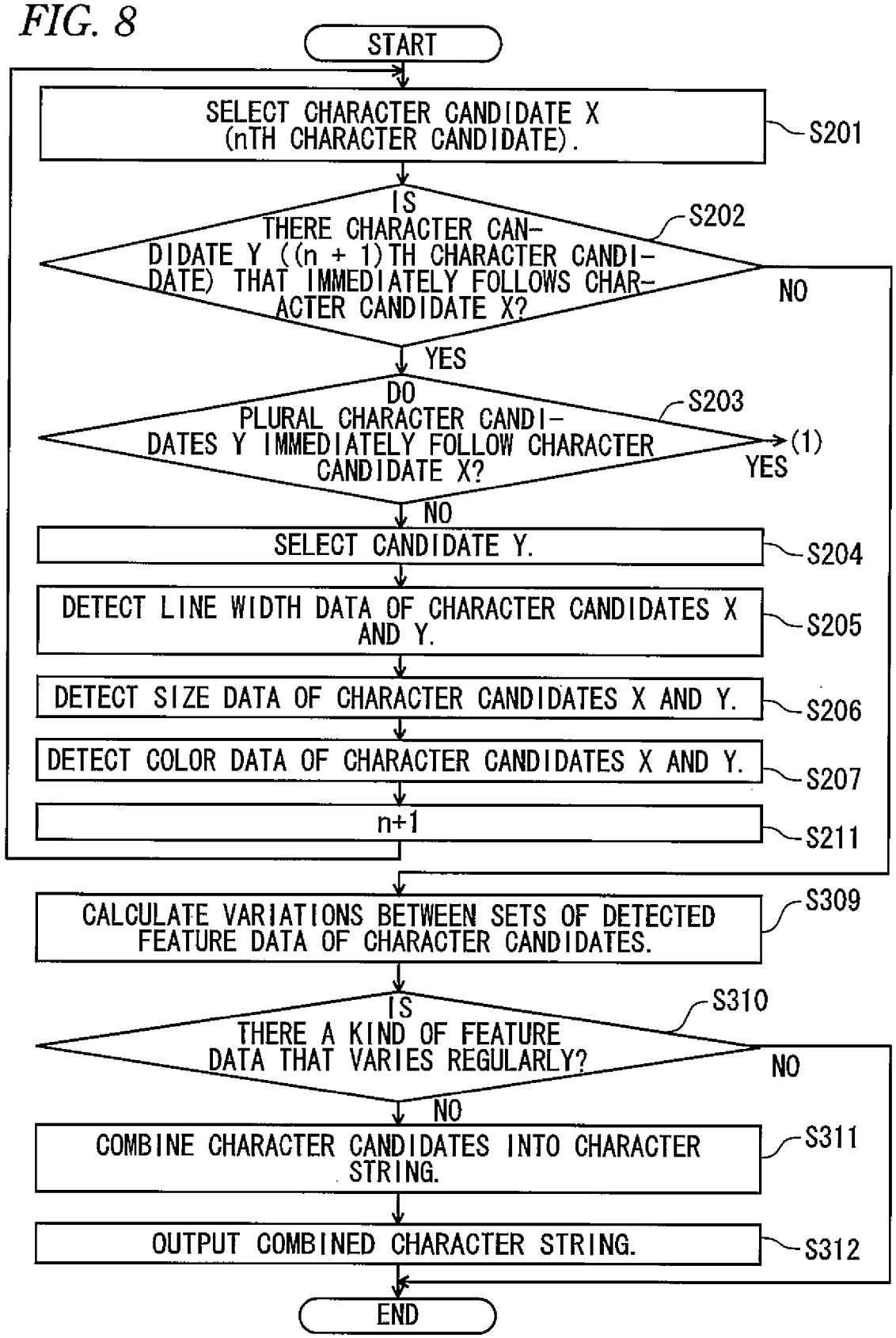
FIG. 8 is a flowchart of a character string combining process according to a second embodiment.
Figure 9:
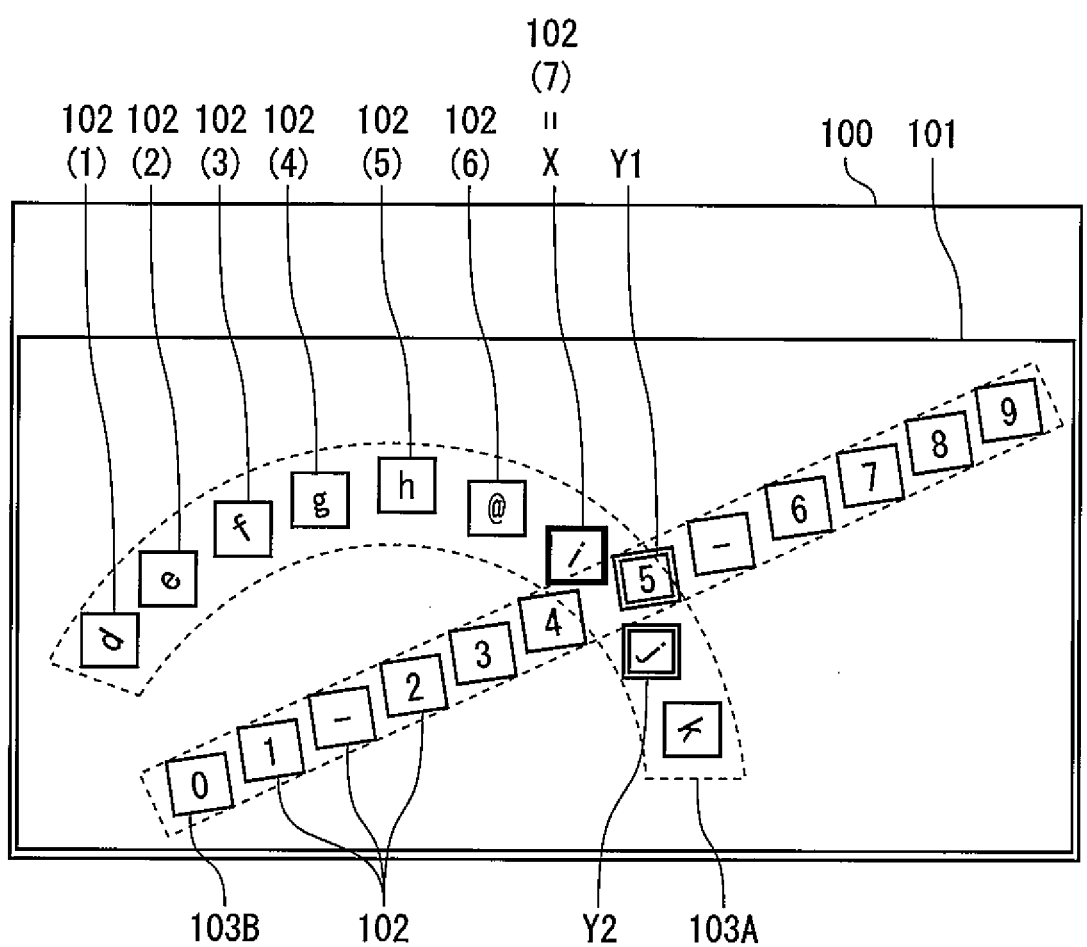
FIG. 9 illustrates a second example for description of the character string combining processing according to the first embodiment.
Figure 10:
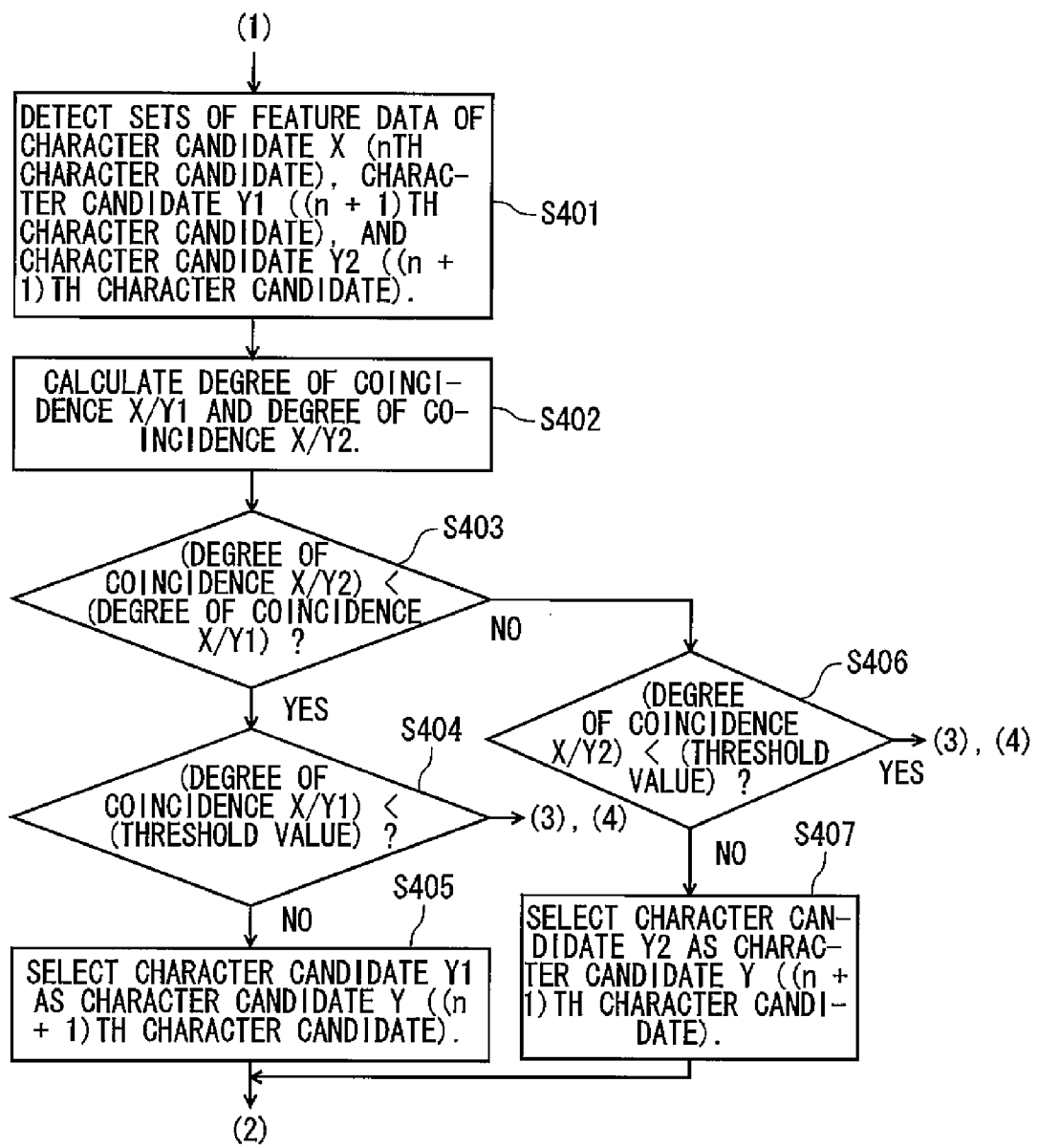
FIG. 10 is a second flowchart of the character string combining process according to the first embodiment.

Character string combining processes according to the first embodiment and a second embodiment will be described below with reference to FIGS. 7 to 10. FIG. 7 is a first flowchart of a character string combining process according to the first embodiment. FIG. 8 is a flowchart of a character string combining process according to the second embodiment. FIG. 9 illustrates a second example for description of the character string combining processing according to the first embodiment. FIG. 10 is a second flowchart of the character string combining process according to the first embodiment.

In the character string combining method according to the first embodiment, character string composition is performed by comparing each pair of character candidates 102. A method of combining a character string 103 by comparing the sets of feature data of each pair of adjoining character candidates 102 (X, Y) in order starting from the first character candidate 102(1) and the second character candidate 102(2) will be described below. The character candidate X is a character candidate as a reference for feature data comparison and the character candidate Y is a character candidate as a subject of feature data comparison. The character candidate Y is used in the character string combining process next to the character candidate X.

More specifically, a degree of coincidence between the first character candidate 102(1) (character candidate X) and the second character candidate 102(2) (character candidate Y) is calculated based on the feature data of the first character candidate 102(1) and the feature data of the second character candidate 102(2) using Equation (1), and the first character candidate 102(1) and the second character candidate 102(2) are combined into a character string 103 if the calculated degree of coincidence is higher than or equal to a threshold value. Then, a degree of coincidence between the second character candidate 102(2) (character candidate X) and the third character candidate 102(3) (character candidate Y) is calculated based on the feature data of the second character candidate 102(2) and the feature data of the third character candidate 102(3) using Equation (1), and the second character candidate 102(2) and the third character candidate 102(3) are combined as the character string 103 if the calculated degree of coincidence is higher than or equal to the threshold value. The above operation is repeated until a new character candidate 102 is not detected any more, whereby the character string 103 is finalized.

The pair of character candidates 102 for feature data comparison are not limited to adjoining character candidates 102. For example, the character candidate X for feature data comparison may be fixed to a certain character candidate 102(n). It is possible to fix the character candidate X to the first character candidate 102(1) and change the character candidate Y as a subject of comparison in order.

Referring to FIG. 7, at step S201, an nth character candidate 102(n) is selected from an image displayed on the display screen 100 according to a prescribed rule. At the start of the process, the index n is set at "1" and hence the first character candidate 102(1) is selected. In the following, the nth character candidate 102(n) as the reference for feature data comparison will be called a character candidate X and the (n+1)th character candidate 102 (n+1) as the subject of feature data comparison will be called a character candidate Y.

At step S202, the character string combining module 16 determines whether a character candidate Y that immediately follows the character candidate X exists or not. If it is determined that no character candidate Y exists (S202: no), the process moves to step S212. On the other hand, if it is determined that a character candidate Y exists (S202: yes), at step S203 the character string combining module 16 determines whether or not plural character candidates Y immediately follow the character candidate X. If it is determined that plural character candidates Y immediately follow the character candidate X (S203: yes), the process moves to step S401 shown in FIG. 10 (indicated by symbol (1)). A character string combining process for the case that plural character candidates Y exist will be described later with reference to FIGS. 9 and 10.

If it is determined that there are not plural character candidates Y (S203: no), at step S204 the character string combining module 16 selects the character candidate Y. At step S205, the feature detection module 15 detects line width data of the character candidates X and Y. At step S206, the feature detection module 15 detects line size data of the character candidates X and Y. At step S207, the feature detection module 15 detects color data of the character candidates X and Y. At step S208, the character string combining module 16 calculates a degree of coincidence between the character candidates X and Y according to Equation (1) using the feature data detected at steps S205-S207 and the contribution factors that are set in the feature data table 12.

At step S209, the character string combining module 16 determines whether or not the degree of coincidence calculated at step S208 is lower than a threshold value. If it is determined that the degree of coincidence is higher than or equal to the threshold value, at step S210 the character string combining module 16 combines the character candidates X and Y into a character string 103. At step S211, the character string combining module 16 adds "1" to the index n. Then, the process returns to step S201. That is, the above steps are executed again after the character candidates X and Y for feature data comparison are changed from the nth character candidate and the (n+1)th character candidate to the (n+1)th character candidate and the (n+2)th character candidate. In this manner, the composition of the character string 103 proceeds as each pair of adjoining character candidates 102 are compared in order.

On the other hand, if it is determined that the degree of coincidence is lower than the threshold value (S209: yes), the character string combining process is finished (indicated by symbol (3) in FIG. 7). Alternatively, the process moves to step S501 shown in FIG. 12 (third embodiment; described later) (indicated by symbol (4)).

If it is determined that no character candidate Y exists (S202: no), at step S212 the character string combining module 16 determines whether or not a combined character string 103 exists. If it is determined that a combined character string 103 exists (S212: yes), at step S213 the character string combining module 16 outputs the combined character string 103 to the character recognition module 17. Examples of the state that no new character candidate Y exists are a state that the character candidate X exists alone and has, around it, no other character candidates with which to constitute a character string 103 together and a case that the character candidate X is the last character candidates 102 of the character string 103. On the other hand, if it is determined that there is no combined character string 103 (S212: no), the character string combining process is finished.

Next, a character string combining method according to the second embodiment will be described with reference to FIG. 8. In the character string combining method according to the second embodiment, sets of feature data are detected from plural character candidates 102 detected by the character detection module 14 and character string composition is performed variations between the sets of feature data. Steps having the same steps in FIG. 7 are given the same reference symbols are will not be described in detail. The order of pairs of character candidates 102 for which variations are calculated is determined according to, for example, the coordinate axes of the display screen 100.

In the second embodiment, the process moves to step S211 after sets of feature data were detected at step S205-S207. That is, sets of feature data are detected for each of other character candidates 102 without calculating a degree of coincidence between the character candidates X and Y.

If it is determined that no character candidate Y exists (S202: no), at step S309 the character string combining module 16 arranges the character candidates 102 according to a prescribed rule and calculates variations between the sets of feature data of the character candidates 102.

At step S310, the character string combining module 16 determines whether or not there exists a kind of feature data that varies regularly. If it is determined that there exists a kind of feature data that varies regularly (S310: yes), at step S311 the character string combining module 16 combines the character candidates 102 into a character string 103. At step S312, the character string combining module 16 outputs the combined character string 103 to the character recognition module 17. On the other hand, if it is determined that there is no kind of feature data that varies regularly (S310: no), the character string combining process according to the second embodiment is finished. That is, if no regular variation of feature data is detected, the character candidates 102 are not combined into a character string 103 with a judgment that the character candidates 102 do not constitute a character string 103.

The character string combining process of the second embodiment is ended as thus described. According to the character string combining process according to the second embodiment, even if the degree of coincidence between plural character candidates 102 is lower than the threshold value, a character string 103 can be combined by calculating variations between sets of detected feature data of all of character candidates 102.

Next, a character string combining process of the case that plural character candidates Y immediately follow a selected character candidate X. FIG. 9 shows an image displayed on the display screen 100 in which a character string 103A and a character string 103B are superimposed on each other. If a region where the character strings 103A and 103B exist is selected by the manipulation input unit 10, a character candidate search region 101 which includes both character strings 103A and 103B is detected as shown in FIG. 9.

The character string 103A is "defgh@ijk" and the character string 103B is "01-2345-6789." For example, the character string combining module 16 has combined a first character candidate 102(1) to a seventh character candidate 102(7) by repeatedly comparing sets of feature data of the character candidate X and the character candidates 102 that are located on the right of the character candidate X within a prescribed distance.

Then, the character string combining module 16 selects the seventh character candidate 102(7) as a character candidate X, that is, a reference for feature data comparison, and detects a character candidate Y as a subject of comparison. However, in the example of FIG. 9, the seventh character candidate 102(7) (character candidate X) has, as character candidates 102 that are located on its right side within the prescribed distance, "5" (referred to as a character candidate Y1) that is included in the character string 103B and "j" (referred to as a character candidate Y2) that is included in the character string 103A. If detecting plural character candidates Y in this manner, the character string combining module 16 detects sets of feature data for each of the character candidates Y and compares degrees of coincidence between the character candidate X and the plural character candidates Y. For example, in the example of FIG. 9, the correct character candidate Y to immediately follow the character candidate X is the character candidate Y2. However, if the character candidate Y1 is selected, the character candidate "-" is selected next and the character candidates belonging to the character string 103B, rather than the character string 103A, come to be subjected to character recognition. To prevent such erroneous recognition, if plural character candidates Y are selected, degrees of coincidence between the character candidate X and the plural character candidates Y are calculated and compared with each other. A character candidate Y that provides a highest degree of coincidence is combined with the character candidate X (nth character candidate). However, if all degrees of coincidence are lower than or equal to the threshold value, the character string combining process is finished.

The character string combining process for the case that plural character candidates Y immediately follow the character candidate X will be described below with reference to a flowchart of FIG. 10. At step S401, the character string combining module 16 detects sets of feature data of the character candidate X (nth character candidate), a character candidate Y1 ((n+1)th character candidate), and a character candidate Y2 ((n+1)th character candidate). At step S402, the character string combining module 16 calculates a degree of coincidence between the character candidate X and the character candidate Y1 (hereinafter referred to as a degree of coincidence X/Y1) and a degree of coincidence between the character candidate X and the character candidate Y2 (hereinafter referred to as a degree of coincidence X/Y2).

At step S403, the character string combining module 16 determines whether or not the degree of coincidence X/Y2 is lower than the degree of coincidence X/Y1. If it is determined that the degree of coincidence X/Y2 is lower than the degree of coincidence X/Y1 (S403: yes), at step S404 the character string combining module 16 determines whether or not the degree of coincidence X/Y1 is lower than a threshold value. If it is determined that the degree of coincidence X/Y1 is higher than or equal to the threshold value (S404: no), at step S405 the character string combining module 16 selects the character candidate Y1 as a character candidate Y. Then, the process moves to step S210 shown in FIG. 7 (indicated by symbol (2)). The term "to select the character candidate Y1 as a character candidate Y" means that the character candidate Y1 is made a new character candidate X as a reference for the next feature data comparison.

Figure 12:
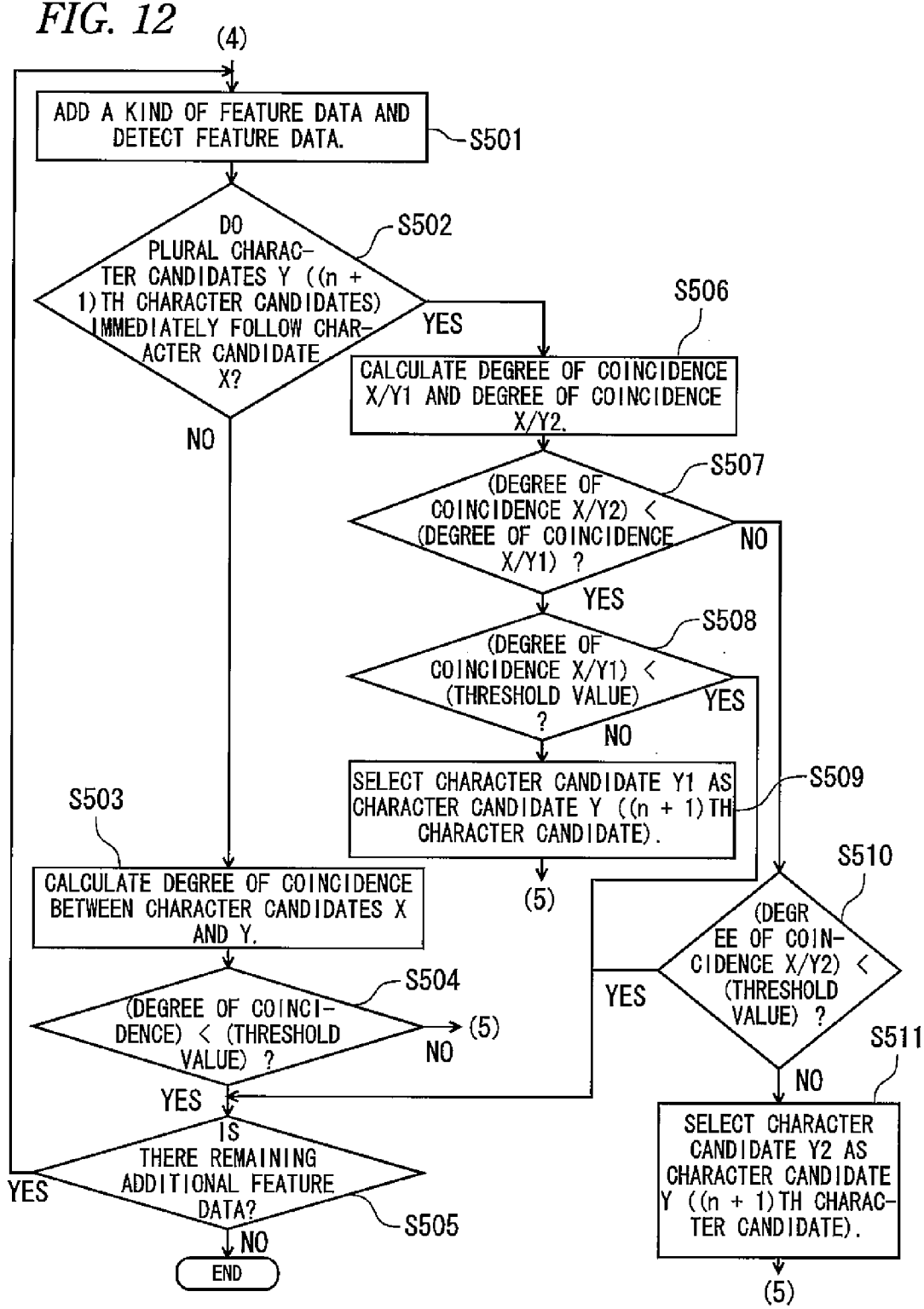
FIG. 12 is a flowchart of a character string combining process according to the third embodiment.

On the other hand, if it is determined that the degree of coincidence X/Y1 is lower than the threshold value (S404: yes), the process returns to the process of FIG. 7 (indicated by symbol (3)) and the character string combining process is finished or the process moves to step S501 shown in FIG. 12 (third embodiment; described later) (indicated by symbol (4)).

On the other hand, if it is determined that the degree of coincidence X/Y2 is higher than or equal to the degree of coincidence X/Y1 (S403: no), at step S406 the character string combining module 16 determines whether or not the degree of coincidence X/Y2 is lower than a threshold value. If determining that the degree of coincidence X/Y2 is higher than or equal to the threshold value (S406: no), at step S407 the character string combining module 16 selects the character candidate Y2 as a character string Y. Then, the process moves to step S210 shown in FIG. 7 (indicated by symbol (2)). The term "to select the character candidate Y2 as a character candidate Y" means that the character candidate Y2 is made a new character candidate X as a reference for the next feature data comparison.

On the other hand, if it is determined that the degree of coincidence X/Y2 is lower than the threshold value (S406: yes), the process returns to the process of FIG. 7 (indicated by symbol (3)) and the character string combining process is finished or the process moves to step S501 shown in FIG. 12 (third embodiment; described later) (indicated by symbol (4)).

Next, the third embodiment will be described with reference to FIGS. 11 and 12. FIG. 11 shows a feature data table used in the third embodiment. FIG. 12 is a flowchart of a character string combining process according to the third embodiment.

In the third embodiment, when the degree of coincidence between the character candidates X and Y is lower than the threshold value, a new set of feature data is added. As shown in FIG. 11, the line width data, the size data, and the color data are already set as kinds of feature data and their values have already been detected. In the third embodiment, a priority rank and a contribution factor are set for each feature data candidate to be added. In the example of FIG. 11, character kind data, direction data, and font data are given first additional priority, second additional priority, and third additional priority, respectively. And the character kind data, the direction data, and the font data are given contribution factors 10%, 5%, and 3%, respectively.

Where the character kind data is added, the degree of coincidence between character candidates 102 is calculated according to, for example, the following Equation (3).

(Degree of coincidence between character candidates)={(degree of coincidence of line width)×α+(degree of coincidence of size)×β+(degree of coincidence of color)×γ}×(1−δ)+(degree of coincidence of character kind)×δ    (Equation 3)

Where the direction data is added further, the degree of coincidence between character candidates 102 is calculated according to the following Equation (4).

(Degree of coincidence between character candidates)=[{(degree of coincidence of line width)×α+(degree of coincidence of size)×β+(degree of coincidence of color)×γ}×(1−δ)+(degree of coincidence of character kind)×δ]×(1−ε)+(degree of coincidence of direction)×ε    Equation (4)

Where the font data is added further, the degree of coincidence between character candidates 102 is calculated according to the following Equation (5).

(Degree of coincidence between character candidates)=[[{(degree of coincidence of line width)×α+(degree of coincidence of size)×β+(degree of coincidence of color)×γ}×(1−δ)+(degree of coincidence of character kind)×δ]×(1−ε)+(degree of coincidence of direction)×ε)]×(1−ζ)+(degree of coincidence of font)×ζ    Equation (5)

As described above, where a kind of feature data is added, the term of the kinds of feature data (line width, size, and color) whose values were detected previously is multiplied by a new value N which is obtained by multiplying an preceding value N by the contribution factor of the kinds of feature data other than the additional kind of feature data. More specifically, where the character kind data is added, N is equal to 1−0.1. Where the character kind data and the direction data are added, N is equal to (1−0.1)×(1−0.05). Where the character kind data, the direction data, and the font data are added, N is equal to (1−0.1)×(1−0.05)×(1−0.03).

Where the direction data is added, since the term of the character kind data has already been taken into consideration, the term of the character kind data is multiplied by 1-0.05. Where the font data is added, since the terms of the character kind data and the direction data have already been taken into consideration, the term of the character kind data is multiplied by (1−0.05)×(1−0.03) and the term of the direction data is multiplied by 1-0.03.

The third embodiment will be described in more detail using the character strings 103A and 103B shown in FIG. 9. Assume that all of the character candidates 102 existing in the image displayed on the display screen 100 have the same line width, size, and color. In this case, it cannot be determined which of the character candidates Y1 and Y2 should be selected as the character candidate Y for the character candidate X. In the third embodiment, the character kind data which is set as the additional feature data candidate having first additional priority is used. Character kind data are detected, and the character candidate Y2 is selected as the character candidate Y because its degree of coincidence with the character candidate X is higher than the character candidate Y1 (the character candidates X and Y2 are both alphabetical characters). As a result, the character candidates 102 can be combined correctly to enable recognition of the character string 103A.

The character string combining process according to the third embodiment will be described with reference to a flowchart of FIG. 12. First, at step S501, the character string combining module 16 rewrites the feature data table 12 by adding, to the kinds of feature data to be used, one having highest additional priority among the additional feature data candidates that are set in the feature data table 12. The feature detection module 15 detects additional feature data of the related character candidates 102. At step S502, the character string combining module 16 determines whether or not plural character candidates Y ((n+1)th character candidates) immediately follow the character candidate X (nth character candidate).

If it is determined that there are not plural character candidates Y, that is, there is only one character candidate Y (S502: no), at step S03 the character string combining module 16 calculates a degree of coincidence between the character candidates X and Y.

At step S504, the character string combining module 16 determines whether or not the calculated degree of coincidence is lower than a threshold value. If it is determined that the calculated degree of coincidence is higher than or equal to threshold value (S504: no), the process moves to step S210 shown in FIG. 7 (indicated by symbol (5)). If it is determined that the calculated degree of coincidence is lower than the threshold value (S504: yes), at step S505 the feature detection module 15 determines whether or not there still remains an additional feature data by referring to the feature data table 12.

If it is determined that there still remains an additional feature data (S505: yes), the process returns to step S501. On the other hand, if it is determined that no additional feature data remains (S505: no), the character string combining process is finished.

On the other hand, if it is determined that plural character candidates Y immediately follow the character candidate X (S502: yes), at step S506 the character string combining module 16 calculates, for example, a degree of coincidence between the character candidate X and a character candidate Y1 and a degree of coincidence between the character candidate X and a character candidate Y2. At step S507, the character string combining module 16 determines whether or not the degree of coincidence X/Y2 is lower than the degree of coincidence X/Y1. If it is determined that the degree of coincidence X/Y2 is lower than the degree of coincidence X/Y1 (S507: yes), at step S508 the character string combining module 16 determines whether or not the degree of coincidence X/Y1 is lower than a threshold value. If it is determined that the degree of coincidence X/Y1 is higher than or equal to the threshold value (S508: no), at step S509 the character string combining module 16 selects the character candidate Y1 as a character candidate Y. Then, the process moves to step S210 shown in FIG. 7 (indicated by symbol (5)). On the other hand, if it is determined that the degree of coincidence X/Y1 is lower than the threshold value (S508: yes), the process moves to step S505.

On the other hand, if it is determined that the degree of coincidence X/Y2 is higher than or equal to the degree of coincidence X/Y1 (S507: no), at step S510 the character string combining module 16 determines whether or not the degree of coincidence X/Y2 is lower than a threshold value. If it is determined that the degree of coincidence X/Y2 is higher than or equal to the threshold value (S510: no), at step S511 the character string combining module 16 selects the character candidate Y2 as a character string Y. Then, the process moves to step S210 shown in FIG. 7 (indicated by symbol (5)). On the other hand, if it is determined that the degree of coincidence X/Y2 is lower than the threshold value (S510: yes), the process moves to step S505.

As described above, according to the embodiments, a character string can be recognized more accurately because the degree of coincidence between detected character candidates is determined in a stricter manner using plural kinds of feature data. Since an application corresponding to a recognized character string is activated based on the recognized character string, the electronic apparatus 1 can operate so that link information are contained in a character string. This eliminates time and labor that the user would otherwise take to input a character string, and thereby increases the convenience of an electronic apparatus.

Although the several embodiments of the invention have been described above, they are just examples and should not be construed as restricting the scope of the invention. Each of these novel embodiments may be practiced in other various forms, and part of it may be omitted, replaced by other elements, or changed in various manners without departing from the spirit and scope of the invention. These modifications are also included in the invention as claimed and its equivalents.

What is claimed is:

1. An electronic apparatus comprising:
   a character detector configured to detect a first character candidate and a second character candidate from an image;
   a feature detector configured to detect first feature data and second feature data,
      the first feature data comprising at least character size, color, or line width of the first character candidate, and
      the second feature data comprising at least character size, color, or line width of the second character candidate;
   a character string combiner configured to combine the first and second character candidates to form a character string when a degree of coincidence between the first feature data and second feature data at least satisfies a threshold coincidence value; and
   a controller configured to detect a portion of the character string indicative of an attribute, and to activate a function corresponding to the attribute.

2. The electronic apparatus of claim 1, wherein the character string combiner is configured to calculate the degree of coincidence between the first character candidate and the second character candidate using plural kinds of feature data for which respective contribution factors are set.

3. The electronic apparatus of claim 1, wherein the character string combiner is configured to
   calculate a first degree of coincidence between the first character candidate and the second character candidate and a second degree of coincidence between the first character candidate and a third character candidate;
   combine the first character candidate and the second character candidate when the first degree of coincidence is greater than the second degree of coincidence; and
   combine the first character candidate and the third character candidate when the second degree of coincidence is greater than the first degree of coincidence.

4. The electronic apparatus of claim 1, wherein
   the character detector is configured to detect a plurality of character candidates;
   the feature detector is configured to detect feature data of each of the plurality of character candidates; and
   the character string combiner is configured to calculate variations between the feature data of the plurality of character candidates, and combine the plurality of character candidates when the calculated variations have regularity.

5. The electronic apparatus of claim 1, wherein the controller is configured to activate a mail application when a portion representing a mail address is detected.

6. The electronic apparatus of claim 1, wherein the controller is configured to activate a browser when a portion representing a Web site address is detected.

7. An electronic apparatus comprising:
   a character detector configured to detect a first character candidate and a second character candidate from an image;
   a feature detector configured to detect feature data of features comprising at least character size, color, or line width from the first character candidate and at least character size, color, or line with from the second character candidate; and
   a character string combiner configured to determine whether to combine the first character candidate and the second character candidate to form a character string based on the feature data.

8. A method for recognizing a character string comprising:
   detecting a first character candidate and a second character candidate from an image;
   detecting first feature data and second feature data, the first feature data comprising at least character size, color, or line width of the first character candidate, and the second character candidate comprising at least character size, color, or line width of the second character candidate;
   determining a degree of coincidence between the first feature data and second feature data; and
   combining the first character candidate and the second character candidate to form a character string when the degree of coincidence is greater than or equal to a threshold value.

9. The method of claim 8, wherein the degree of coincidence between the detected first feature data and second feature data is calculated using plural kinds of feature data for which respective contribution factors are set.

10. The method of claim 8, further comprising:
   calculating a first degree of coincidence between the first character candidate and the second character candidate and a second degree of coincidence between the first character candidate and a third character candidate;

combining the first character candidate and the second character candidate when the first degree of coincidence is greater than the second degree of coincidence; and combining the first character candidate and the third character candidate when the second degree of coincidence is greater than the first degree of coincidence.

* * * * *